United States Patent [19]

Gaymans

[11] Patent Number: 4,868,280

[45] Date of Patent: Sep. 19, 1989

[54] COPOLYAMIDE FROM TETRAMETHYLENE DIAMINE, ADIPIC ACID AND TEREPHTHALIC ACID

[75] Inventor: Reinoud J. Gaymans, Boekelo, Netherlands

[73] Assignee: Stamicarbon B.V., Geleen, Netherlands

[21] Appl. No.: 231,558

[22] Filed: Aug. 12, 1988

Related U.S. Application Data

[63] Continuation-in-part of Ser. No. 943,910, Dec. 19, 1986, abandoned.

[30] Foreign Application Priority Data

Jan. 4, 1986 [NL] Netherlands .......................... 8600006

[51] Int. Cl.$^4$ .............................................. C08G 69/26

[52] U.S. Cl. ..................................... 528/339; 528/335; 528/347

[58] Field of Search ......................... 528/339, 335, 347

[56] References Cited

U.S. PATENT DOCUMENTS 4,603,166  7/1986  Poppe et al. ........................ 524/606

Primary Examiner—Harold D. Anderson
Attorney, Agent, or Firm—Cushman, Darby & Cushman

[57] ABSTRACT

The invention relates to a novel grade of copolymides of tetramethyleneadipamide (nylon 4.6) and tetramethyleneterephthalamide (nylon 4.T) containing a mole fraction nylon 4.T of 0.1 to 0.6 and having such a degree of orientation that the melting temperature shows little dependence on the composition of the copolyamide and remains relatively low and which copolyamides have good mechanical properties.

17 Claims, No Drawings

COPOLYAMIDE FROM TETRAMETHYLENE DIAMINE, ADIPIC ACID AND TEREPHTHALIC ACID

This application is a continuation-in-part of U.S. application Ser. No. 06/943,910, filed Dec. 19, 1986, now abandoned, the contents of which are incorporated herein.

The invention relates to a novel grade of copolyamides of tetramethyleneadipamide (nylon 4.6) and tetramethyleneterephthalamide (nylon 4.T) and a process for the preparation thereof.

C. Aubineau et al., Bulletin de la Societe chimique de France, 1970, pp. 533–537 and pp. 1404–1408 describes copolymers of nylon 4.6 and nylon 4.T and the preparation thereof by means of solution polymerization. Here the 4.6:4.T ratio in the compositions ranges between 1:0 and 0:1.

The principal characteristics of these known copolymers is formed by the high degree of isomorphism, which manifests itself, inter alia, in a regular increase of the melting temperature of the copolymer as the 4.T content increases. Isomorphous copolymers generally have the advantage that above the glass transition temperature, too, the mechanical properties are substantially preserved so that these copolymers are particularly suitable for uses at higher temperature. However, this increase for melting temperature with increasing 4.T content has the drawback that at elevated temperatures nylon 4.6 will decompose in the melt very easily which has a negative influence on the quality and appearance of molded goods like filaments, films and injection-molded articles obtained by processing from the melt. For this reason the nylon 4.6/4.T copolymers described by Aubineau et al. have limitations in so far as their uses are concerned.

Amorphous copolymers generally have a minimum melting temperature and a definite decline of mechanical properties above the glass transition temperature. On the other hand, owing to their lower melting temperature, it is easier for amorphous copolymers to be processed via the melt. This is important notably for copolymers containing nylon 4.6. However, above the glass transition temperature the mechanical properties of fully amorphous copolymers are less advantageous.

It is therefore the object of the invention to find a 4.6/4.T copolymer which shows the characteristics of copolymers with respect to their melting temperature and the superior mechanical properties at high temperature connected with isomorphous copolymers.

It has now been found that it is possible for 4.6/4.T copolyamides to be prepared having such a degree of orientation that in a composition range in which the mole fraction (p) 4.T ranges between 0 and about 0.6, most preferably between 0.1 and 0.6 the melting temperature shows little dependence on the composition of the copolyamide and remains relatively low, and the copolyamides have good mechanical properties.

The copolyamide of tetramethyleneadipamide and tetramethyleneterephthalamide according to the invention is characterized by a composition in which the mole fraction (p) tetramethyleneterephthalamide ranges between 0.1 and 0.6 and the melting temperature of the copolyamide is lower than $t_m(4.6) + p(t_m(4.T) - t_m(4.6))$, where $t_m(4.6)$ and $t_m(4.T)$ stand for the melting temperatures of homopolytetramethyleneadiamide and homopolytetramethyleneterephthalamide, respectively.

Copolyamides according to the invention can be obtained by heating mixtures of tetramethylenediamine and a stoichiometric amount of terephthalic acid and adipic acid. It is preferred to start from a mixture of the salt of tetramethylenediamine and adipic acid (nylon 4.6 salt) and the salt of tetramethylenediamine and terephthalic acid (nylon 4.T salt). The mixture of the salts is heated in an inert atmosphere in a closed reactor for 10 to 180 minutes, preferably 20 to 120 minutes, at a temperature of 170° to 250° C., preferably between 180° and 230° C. and especiallly between 190° and 220° C. The reaction is carried out in the presence of an excess of tetramethylenediamine of between 1 and 12 moles % calculated on the acid groups present, preferably between 2 and 10 moles %. For the reaction to proceed well, it is advantageous to add some water to the reaction mixture. For instance, add water of between 1 to 10% (wt) calculated on the total amount of nylon salts presented, more specifically about 5% (wt).

The product obtained from the reactor after cooling and pressure relief is subsequently subjected to after-condensation in order to obtain a polymer of a sufficiently high molecular weight. The after-condensation is carried out at a chosen temperature between 220° and 340° C., preferably between 240° and 310° C., in a steam-containing inert gaseous atmosphere. The chosen pressure at which the after-condensation is carried out may range within very wide limits, for instance between 0.01 and 10 bar. For practical reasons, it is preferred to use a pressure between 0.1 and 3 bar, especially a pressure approximately equal to atmospheric pressure.

It is particularly advantageous, instead of starting from a mixture of nylon 4.6 and nylon 4.T salts, first to react the terephthalic acid with tetramethylenediamine to form di(4-aminobutyl)tetraphthalamide and to subsequently prepare the copolymers by mixing di(4-aminobutyl)terephthalamide, adipic acid and nylon-4.6 salt and polymerizing these according to the nylon salt procedure.

The polyamides according to this invention are copolyamides containing tetramethyleneadipamide and tetramethyleneterephthalamide as principal components. In principle, there are no restrictions regarding the presence of other copolymers in amounts that do not have an adverse effect on the properties of the copolyamides according to the invention, so that all amide-forming substances known in the art can be chosen.

Other additives like colorants, fillers, reinforcing agents, heat stabilizers, antioxidants, lubricants, nucleation agents, release agents, softeners, flame retardants, antistatic agents and other polymers can be added to the copolyamide according to the invention in such an amount that the processability and the physical properties are not affected.

The copolyamides of tetramethyleneadipamide and tetramethyleneterephthalamide (4.6/4.T) according to the invention display a relatively constant melting temperature even as the fraction of tetramethyleneterephthalamide, which itself has a high melting temperature, is increased. This property allows easy melt processing, for instance meltspinning, and is completely unexpected. By comparison, in Poppe et al. U.S. Pat. No. 4,603,166, col. 18, the copolyamides of hexamethylenediamine with adipic acid and terephthalic acid (6.6/6.T) display an increasing melting temperature as the fraction of terephthalic acid is increased. When terephthalic acid is increased by even the slight amount where the mole ratio of terephthalic acid to adipic acid is 0.18, the melting temperature of the copolyamide becomes too high to be useful in melt spinning. See Poppe et al. U.S. Pat. No. 4,603,166, col. 18. The present invention unexpected in light of the fact that nylon 6.6 adipic acid/tetramethylenediamine has a considerably lower melting temperature than nylon 4.6 adipic acid/tetramethylenenadipamide, which are 265° C. and 289° C., respectively.

The copolyamides of tetramethyleneadipamide and tetramethyleneterephthalamide according to the invention display superior mechanical properties, specifically in stiffness, as compared to the 4.6 homopolymer homopolytetramethyleneadipamide. The reaction pendulum modulus values of the polyamides of the whole range of inventive compositions are higher than that of the homopolymer, even up to more than 70%. By comparison, when the terephthalic acid to adipic acid mole ratio is less than 0.50, then the corresponding copolyamides of hexamethylenediamine with adipic acid and terephthalic acid display inferior mechanical properties as compared to the nylon 6.6 homopolymer adipic acid hexamethyldiamine. Pope et al. U.S. Pat. No. 4,603,166, col. 18.

Thus, the copolyamides according to the invention have melting temperatures that make it possible to use them in meltprocessing, for instance meltspinning, and mechanical properties that are superior to those of the aliphatic homopolymer. The copolyamides of Pope et al., U.S. Pat. No. 4,603,166 have either melt temperatures that are too high for meltspinning or mechanical properties that are inferior to the aliphatic homopolymer.

The copolyamides according to the invention can be used for molding products from the melt by means of, inter alia, injection molding, extrusion, extrusion blowing and molding.

Products obtained by applying copolyamides according to the invention may be car parts, electrical parts, films, fibers, various consumer goods, etc.

The invention will be further elucidated by means of the following examples, which are not exhaustive.

The following methods were used to determine the properties of the polymers in the examples.

Differential thermal analysis (DTA) to determine the melting temperature, the melting heat.

In applying this method, the polymers subjected to after-condensation were rapidly heated to about 360° C., subsequently cooled at a rate of 80° C./minute and once again subjected to controlled heating at a rate of 20° C./minute to about 10° C. above the melting point of the polymer.

The values of the melting temperature $T_m$ and for the melting heat H, obtained from the second scan, are mentioned in the table. The $T_m$ that was taken was the peak temperature of the endothermic curve. If there are more peaks, they are mentioned. The measurements were made in a Du Pont thermal analyzer.

As characteristic for the mechanical properties the torsion pendulum modulus (log G') was measured at different temperatures on strips of the polymer molded from the melt. To this end the ground polymer was dried in a vacuum oven at 100° C. for 24 hours and molded at 10° C. above the melting temperature and subsequently cooled to 20° C. The torsion modulus was measured at a constant frequency of 0.115 Hz and a heating rate of 1° C. min-1.

The inherent viscosity ($N_{inh}$) is determined on a solution of 0.5 gram polymer in 100 ml 96% (wt) sulphuric acid.

EXAMPLE 1

Nylon 4.6 salt is prepared in the manner described in R. J. Gaymans et al. in J. Polym. Sci, Chem. ed. 15, 537 (1977), in methanol, and has a pH=7.2 (in a 1% (wt) solution in water). Nylon 4.T salt is prepared in water and precipitated with ethanol according to the process described in R. J. Gaymans et al. in J. Polym. Sci. The pH of a 1% (wt) solution in water is 7.25.

25 gram of a mixture of nylon 4.6 salt and nylon 4.T salt, 1.25 ml water and tetramethylenediamine (8 mole % excess) is introduced into a 100 ml stainless steel autoclave. The autoclave is flushed with nitrogen and given a starting pressure of 5 bar. The autoclave is subsequently heated to 210° C. in 60 minutes and kept at this temperature for 40 minutes. After pressure relief and cooling, the prepolymer formed is removed from the autoclave and, in the form of a powder, subjected to after-condensation in a gaseous nitrogen/steam flow (ratio 2:1) in a fluidized bed reactor for 4 hours at 260° C.

Of the resulting product of after-condensation the melting point, melting heat torsion (pendulum) modulus and inherent viscosity are determined in the manner described above.

The results hereof are mentioned in Table 1, for different compositions of the copolymer.

EXPERIMENT II

Di(4-aminobutyl)terephthalamide is prepared by heating 99 grams dimethylterephthalate (0.5 mole) and 132 grams tetramethylenediamine (1.5 moles) in a nitrogen atmosphere in a dry reaction flask to 115° C. in about 60 minutes and kept at this temperature for 2 hours. The reaction product is ground and extracted with diethylether. Using infrared spectrometry no more ester is demonstrated.

25 grams mixture of nylon 4.6 salt and di(4-aminobutyl)terephthalamide, 1.5 ml water and an amount of adipic acid so that the excess of tetramethylenediamine is 8 mole % is subsequently converted in the manner described in example I into copolyamide and the properties thereof are determined.

The results are shown in Table 2.

The results of these experiments show that the 4.6/4.T copolyamides according to the invention have a melting temperature changing only very slightly over a very wide range of compositions, so that the processability is not adversely affected. The pendulum torsion modulus, on the other hand, does increase as the 4.T content increases and is still high even at a temperature of 140° C.

The relatively small change of the melting heat compared to nylon 4.6 is an addition that the copolymers still have a substantial degree of orientation corresponding with that of nylon 4.6.

TABLE 1

| (Polymerization with nylon-salt mixtures) | | | | | |
|---|---|---|---|---|---|
| Materials | | $T_m$ | $\Delta H_m$ | Log G' (Pa) | |
| 4.6/4.T | $n_{inh}$ | (°C.) | (J/g) | 20° | 140° |
| 100/0 | 1.30 | 282/290 | 77 | 8.93 | 8.36 |
| 90/10 | 1.08 | 280/289 | 68 | 9.00 | 8.40 |

TABLE 1-continued (Polymerization with nylon-salt mixtures)

| Materials 4.6/4.T | $n_{inh}$ | $T_m$ (°C.) | $\Delta H_m$ (J/g) | Log G' (Pa) 20° | Log G' (Pa) 140° |
|---|---|---|---|---|---|
| 80/20 | 0.97 | 282/293 | 64 | 9.03 | 8.50 |
| 70/30 | 0.72 | 296/302 | 73 | — | — |
| 50/50 | 0.49 | 309 | 76 | — | — |
| 0/100(8) | 0.19 | 425/475 | 108 | — | — |

TABLE 2

(Polymerization with di(4-aminobutyl)terephthalamide

| Materials 4.6/4.T | $n_{inh}$ | $T_m$ (°C.) | $\Delta H_m$ (J/g) | Log G' (Pa) 20° | Log G' (Pa) 140° |
|---|---|---|---|---|---|
| 100/0 | 1.30 | 282/290 | 77 | 8.93 | 8.36 |
| 70/30 | 1.04 | 296 | 69 | 9.02 | 8.51 |
| 50/50 | 0.75 | 310 | 77 | 9.12 | 8.60 |

I claim:

1. A tetramethyleneadipamide/tetramethyleneterephthalamide copolyamide having a mole fraction tetramethyleneterephthalamide (p) of between 0.1 and 0.6 and a melting temperature lower than $T_m$ (4.6)+p ($T_m$ (4.T)−$T_m$ (4.6)), where $T_m$ (4.6) and $T_m$ (4.T) represent the melting temperatures of homopolytetramethyleneadipamide and homopolytetramethyleneterephthalamide, respectively.

2. The copolyamide according to claim 1, having a melting temperature lower than $T_m$ (4.6)+p(60).

3. A tetramethyleneadipamide/tetramethyleneterephthalamide copolyamide having a mole fraction tetramethyleneterephthalamide (p) of between 0.1 and 0.6 and a melting temperature lower than $T_m$(4.6)+p ($T_m$(4.T)−$T_m$ (4.6)), where $T_m$ (4.6) and $T_m$ (4.T) represent the melting temperatures of homopolytetramethyleneadipamide and homopolytetramethyleneterephthalamide, respectively, and having a torsion pendulum modulus which is equal to or higher than that of homopolytetramethyleneadipamide.

4. The copolyamide according to claim 3, having a torsion pendulum modulus which is higher than that of homopolytetramethyleneadipamide.

5. A process for preparing a tetramethyleneadipamide/tetramethyleneterephthalamide copolyamide having a mole fraction tetramethyleneterephthalamide (p) of between 0.1 and 0.6 and a melting temperature lower than $T_m$(4.T)+p ($T_m$(4.T)−$T_m$(4.6)), where $T_m$(4.6) and $T_m$(4.T) represent the melting temperatures of homopolytetramethyleneadipamide and homopolytetramethyleneterephthalamide, respectively, said process comprising melt polymerizing a mixture of tetramethylenediamine, terephthalic acid and adipic acid, or salts thereof, in order to form a prepolymer and subsequently after-condensing said prepolymer in order to form the copolyamide.

6. The process according to claim 5, wherein a mixture of the salt of tetramethylenediamine and adipic acid and the salt of tetramethylenediamine and terephthalic acid is melt polymerized.

7. The process according to claim 5, wherein the mixture of (a) di(4-aminobutyl)terephthalamide), (b) the salt of tetramethylenediamine and adipic acid, and (c) adipic acid is melt polymerized.

8. The process according to claim 5, wherein the mixture contains a molar excess of tetramethylenediamine.

9. The process according to claim 8, wherein the molar excess of tetramethylenediamine is 1 to 12 mole % calculated on the acid groups present.

10. The process according to claim 9, wherein the molar excess of tetramethylenediamine is 2 to 10 mole %.

11. The process according to claim 6, wherein water is added to the mixture.

12. The process according to claim 11, wherein the amount of water added to the mixture is between 1 and 10% (wt) calculated on the total amount of the mixture.

13. The process according to claim 5, wherein the melt polymerization is carried out at a temperature between 170° and 250° C.

14. The process according to claim 5, wherein the after-condensation is carried out in a steam-containing inert gaseous atmosphere at a temperature of between 222° and 340° C.

15. The process according to claim 13, wherein the melt polymerization is carried out at a temperature between 180° and 230° C.

16. The process according to claim 13, wherein the melt polymerization is carried out at a temperature between 190° and 220° C.

17. A shaped article formed from a tetramethyleneadipamide/tetramethyleneterephthalamide copolyamide having a mole fraction tetramethyleneterephthalamide (p) between 0.1 and 0.6 and a melting temperature lower than $T_m$(4.6)+p ($T_m$(4.T)−$T_m$(4.6)), where $T_m$(4.6) and $T_m$(4.T) represent the melting temperatures of homopolytetramethyleneadipamide and homopolytetramethyleneterephthalamide, respectively.

* * * * *